April 25, 1933.    J. C. WOODMAN    1,905,120
INCINERATOR
Filed Oct. 17, 1928    6 Sheets-Sheet 1

INVENTOR
Joseph C. Woodman
BY Moakley & Gill
ATTORNEYS

April 25, 1933.  J. C. WOODMAN  1,905,120
INCINERATOR
Filed Oct. 17, 1928   6 Sheets-Sheet 5

April 25, 1933.  J. C. WOODMAN  1,905,120
INCINERATOR
Filed Oct. 17, 1928   6 Sheets-Sheet 6

Fig. 9
Fig. 10

INVENTOR
Joseph C. Woodman
BY Moakley & Gill
ATTORNEYS

Patented Apr. 25, 1933

1,905,120

UNITED STATES PATENT OFFICE

JOSEPH C. WOODMAN, OF FLUSHING, NEW YORK, ASSIGNOR TO DECARIE INCINERATOR CORPORATION, OF NEW YORK, N. Y., A CORPORATION OF NEW YORK

INCINERATOR

Application filed October 17, 1928. Serial No. 313,058.

The present invention relates to furnaces or incinerators having particular reference to brick furnaces suitable to be employed in the disposal of garbage and rubbish. Brick furnaces have the advantage of absorbing and interiorly radiating heat derived from the internal combustion, which contributes to the drying and improved burning of the refuse deposited in such furnaces. As heretofore constructed, brick furnaces, in receiving deposits of garbage and rubbish, have been forced to attempt to burn an accumulated mass of dense, packed and soggy refuse. In the former types of furnaces, the intensity of the heat due to the brick walls thereof largely lost its potential value because of its inability to permeate the dense and soggy mass of deposited refuse from the bottom upward through and around the mass.

To avoid this wasteful and inefficient method, and at the same time to take advantage of those properties of the brick furnace which can contribute to the quick and thorough disposal of waste material, it is proposed to arrange an indestructible open basket grate construction within a furnace of the brick type. Thus, deposits of waste material may be held suspended for the free permeation of air and hot gases therethrough, resulting in a rapid drying and consumption of the waste material. Provision is also made of means for destroying any tendency of the mass of the waste material to become or remain packed, and to prevent to a large extent this refuse from coming into contact with heated brickwork, which causes rapid deterioration of the brickwork and is attended by high repair bills.

Highly important phases of the present invention lie in the constructional relationship existing between the brick furnace walls and the basket grate and in the provisions for circulation. Due to the peculiar assemblage of the respective elements of these major portions of the furnace, the latter may be built in such manner that subsequent repairs and replacements in the basket grate construction may be accomplished in a minimum of time and with exceptional ease. The construction of the basket grate may partake of different forms, but it is contemplated to build it of standard material readily obtainable in the open market at any time.

A novel choice and assembly of standard commercial parts results in an ability to separate and remove any part of the basket grate construction without requiring an extensive dismantling of such grate. Another advantage of great consequence is the avoidance of the necessity for tearing down any part of the furnace when repairing the basket grate.

Other features and advantages appearing hereinafter will, of course, be understood to form parts of the present invention.

Referring to the drawings, 1 indicates the front wall of a furnace, the side walls 2 thereof extending to a rear furnace wall 3, which in extending upward does not reach the top furnace wall 4, thereby leaving space between the rear, top and side walls that forms an outlet 5 to a flue. The enclosure formed by the walls 1, 2, 3 and 4 constitutes a combustion chamber 6, which is formed with fire-brick 7 that constitutes part of the walls of the furnace. The furnace is provided with a jacket of steel plates 8, appropriate angles, I-beams, etc., being used to combine the sheet steel and afford supports.

Figure 1:
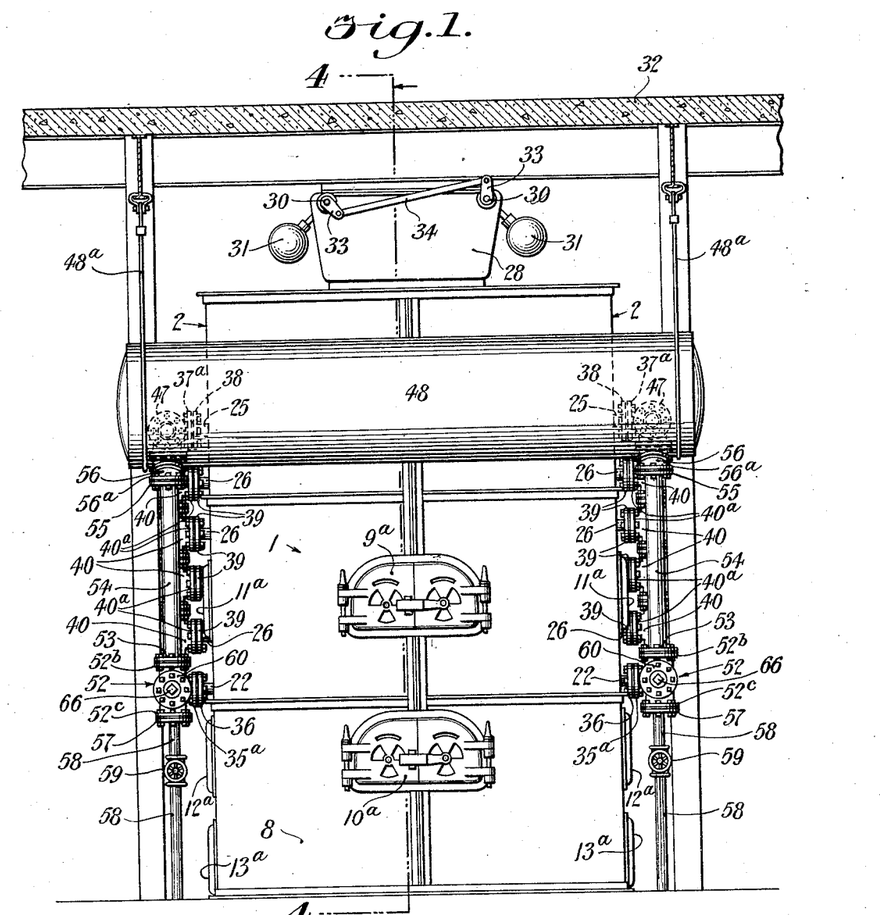
Fig. 1 is a front elevation of the furnace.
Figure 2:
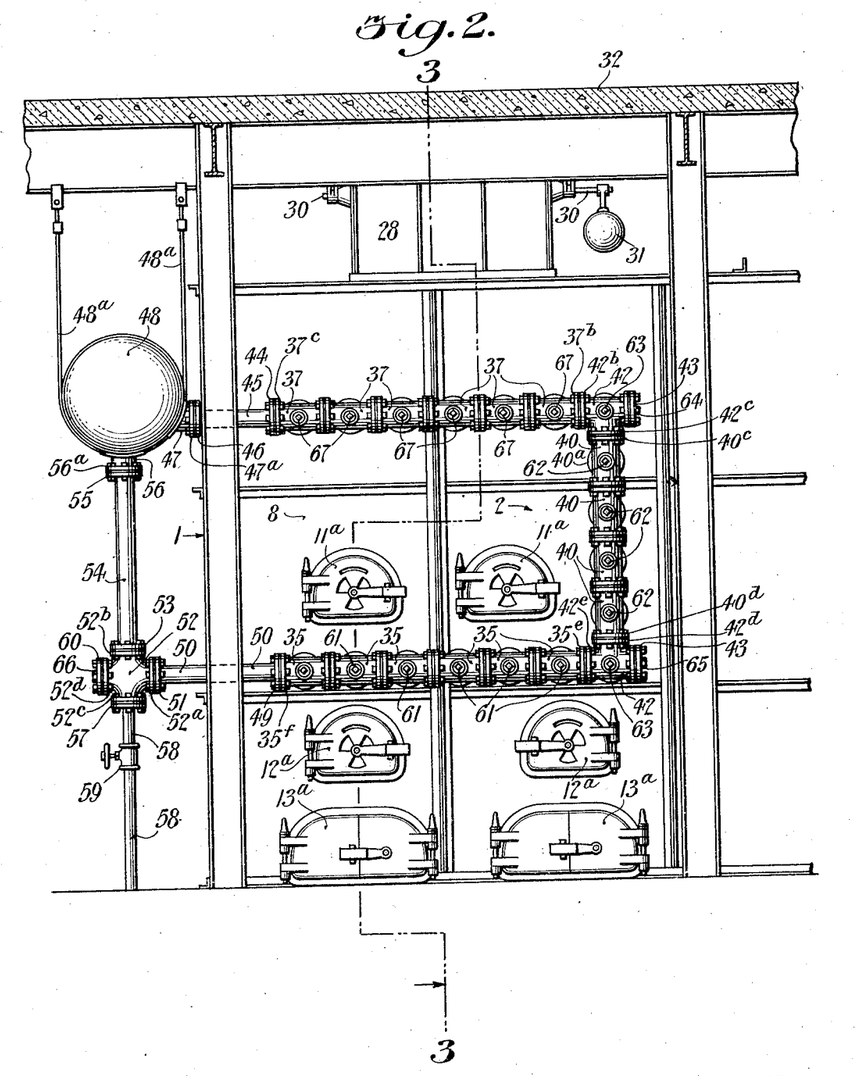
Fig. 2 is a side elevation thereof.
Figure 3:
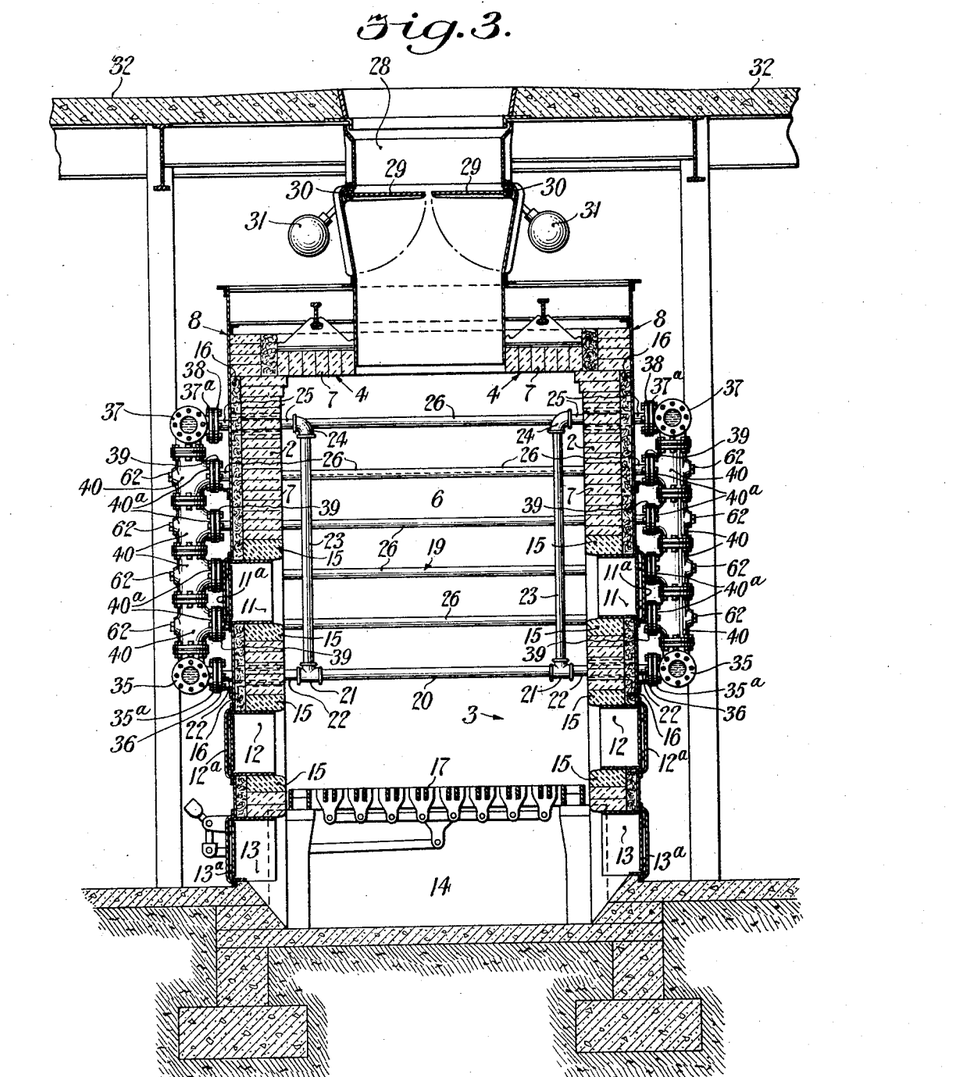
Fig. 3 is a vertical section through the furnace taken substantially on line 3—3 of Fig. 2.
Figure 4:
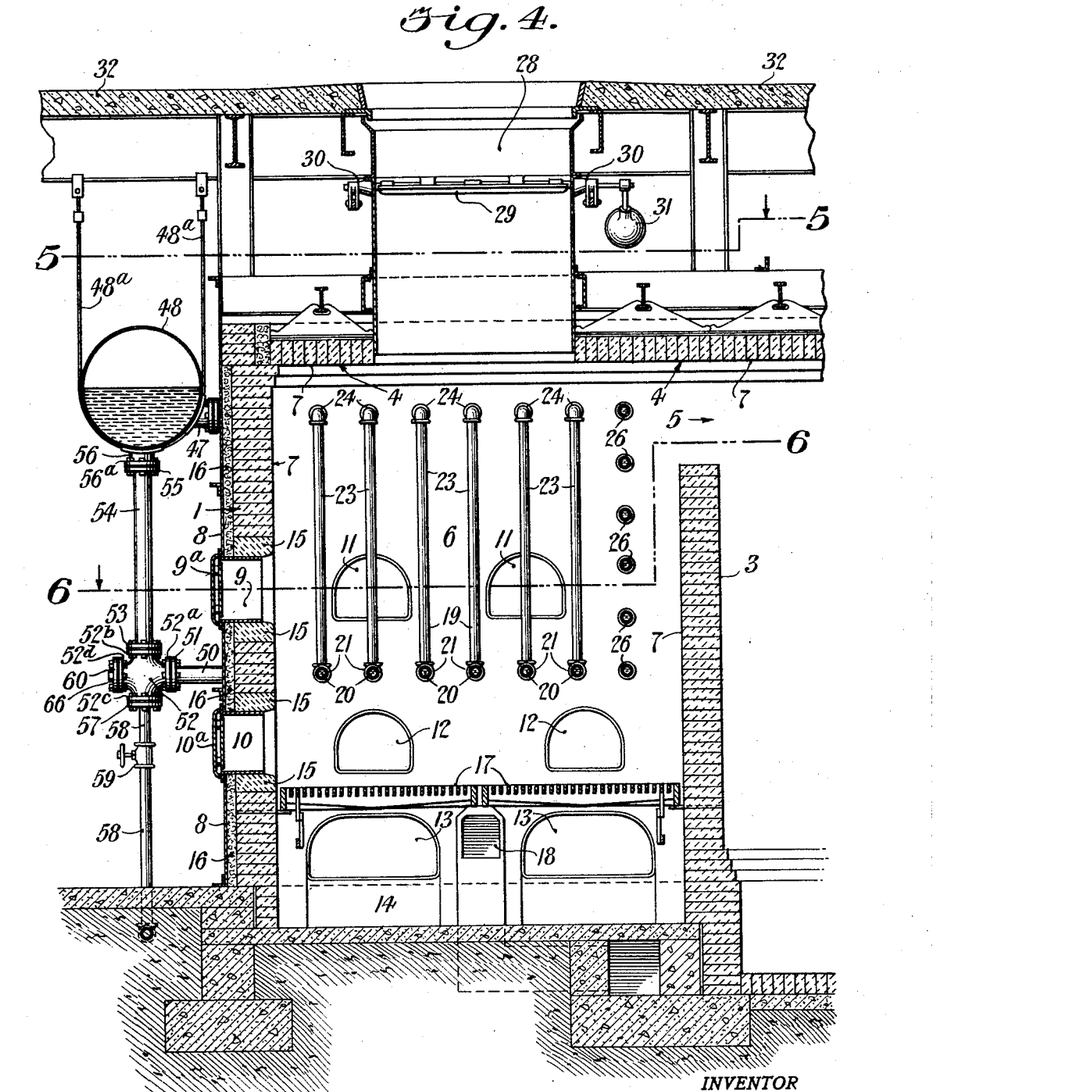
Fig. 4 is another vertical section through the furnace at right angles to the section of Fig. 3, and is taken on the line 4—4 of Fig. 1.
Figure 8:
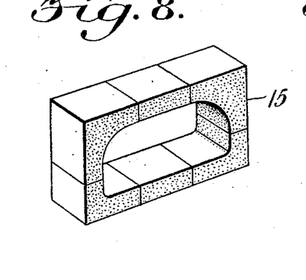
Fig. 8 is a similar view of one of the split tiles that fit about the door castings.

Figs. 1 and 4 show the front wall 1 as being provided with upper and lower doorways 9 and 10, respectively, adapted to be closed by doors 9a and 10a. Similarly, as shown in Figs. 2, 3 and 4, the side walls 2 each contains upper and lower doorways 11 and 12, respectively, furnished with doors 11a and 12a. Below the lower doorways 12, the furnace side walls 2 are further provided with doorways 13, giving access to an ash pit 14, these doorways being closed by doors 13a. Refractory sectional tile 15, such as is shown in Fig. 8 is used around the doorway castings, and is also used in places where its moulded-to-the-purpose form makes for ease and economy in fitting. Improved retention of the heat in the combustion chamber 6 is had by the interposition of mineral wool 16, or other thermal insulation in the space between the brick walls and their steel jacket.

Shaking grates 17 are mounted near the bottom of the furnace walls a little below the doorways 10 and 12, separating the combustion chamber 6 and the ash pit 14, a hot blast duct 18 delivering heated air that passes upward through the grates 17.

Within the furnace and interposed between the shaking grates 17 and the top wall 4 of the furnace is a basket grate 19, which is preferably constructed of pipe and standard pipe fittings. An unusual selection of standard fittings, a novel assemblage of them and the pipes as well as a peculiar combination of the pipes, fittings and the furnace walls produce a new furnace construction that possesses advantages hitherto unattained, as will become more apparent hereinafter.

The bottom of the basket grate is formed of horizontally disposed pipes 20 the opposite ends of which are threaded into T-fittings 21. Threaded into the opposite ends of these T-fittings and axially aligned with the pipes 20 are shorter pipes 22, forming extensions of the pipes 20. The extension pipes 22 pass through sleeves lining holes in the brick walls 2 and through the sheet steel sheathing 8 therefor, extending beyond the sheathing for a distance suited for connections to be referred to later. The bores of the sleeves through which the extension pipes 22 pass are sufficiently larger than these pipes to allow for their maximum expansion when heated.

The pipe lines formed by the connected pipes 20 and 22, and which form the bottom of the basket grate 19, are spaced apart a suitable distance in a horizontal plane to receive and support refuse deposited thereon. The extension pipes 22, being supported by the sheathing of the side walls 2 of the furnace, as explained later, hold the bottom of the basket grate 19 in place.

Each of the T-fittings 21 has its third neck or threaded aperture directed upwardly, and a vertical pipe 23 is screwed into it. Consequently, there are two rows of spaced vertical pipes 23, one row being adjacent to one of the brick walls 2, and the other row being in relative proximity to the other brick wall 2 of the furnace. At their upper ends, the vertical pipes 23 have elbows 24 screwed thereon, and into the bent-over ends of the elbows short pipes 25 are screwed, as best seen in Fig. 3. The extension pipes 25 are horizontally disposed and pass through the walls 2 of the furnace in a manner similar to the projection therethrough of the bottom extension pipes 22.

Figure 6:
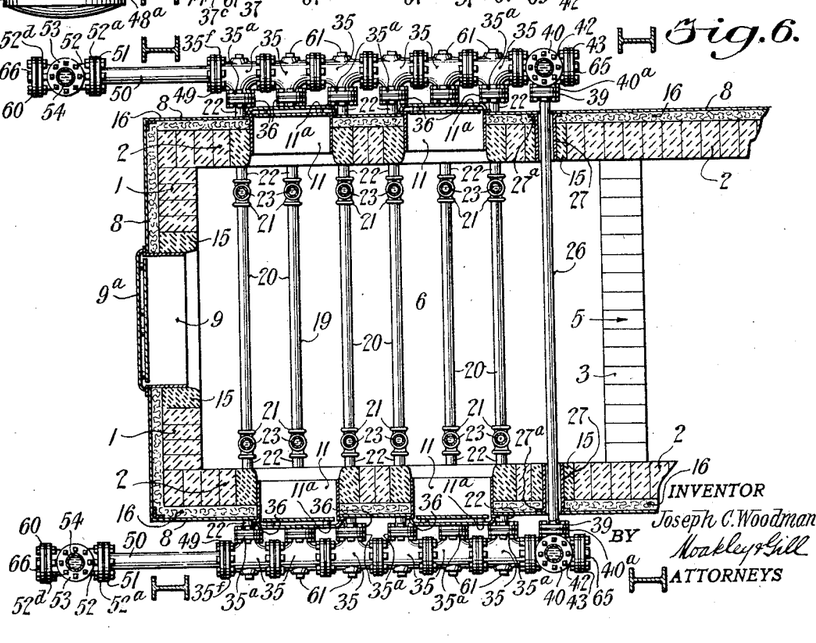
Fig. 6 is a horizontal section through a portion of the furnace at a lower level, and is taken on the line 6—6 of Fig. 4.
Figure 7:
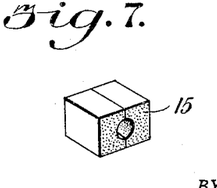
Fig. 7 is a perspective view of one of the split refractory tiles that surround the wall sleeves.

Forming the back of the basket grate 19 is a vertical row of horizontally positioned pipes 26, shown to advantage in Figs. 3, 4 and 6. The pipes 26 are continuous from beyond one side wall 2 of the furnace to a corresponding distance beyond the outside of the other furnace wall 2. Like the pipes 22 and 25, the pipes 26 pass through metallic sleeves 27 in the furnace walls 2, as best seen in Fig. 6, the bore of the sleeves being large enough to allow for the maximum expansion of the pipes due to their absorption of heat. The metallic sleeves 27 are provided with flanges 27a at their outer ends which are secured to the metal sheathing 8 of the furnace jacket. The cylindrical sleeves 27 extend through the vertically split refractory tile 15 that is shown in Figs. 6 and 7, and which is internally conformed to the sleeves and externally to the firebrick of the furnace walls. Since the pipes 22, 25 and 26 pass through the metallic sleeves 27, and the flanges 27a of the latter are secured to the steel sheathing 8 of the furnace walls, the load of the basket grate 19 is carried by such steel sheathing and the brick walls are relieved of it.

Figures 9, 10:
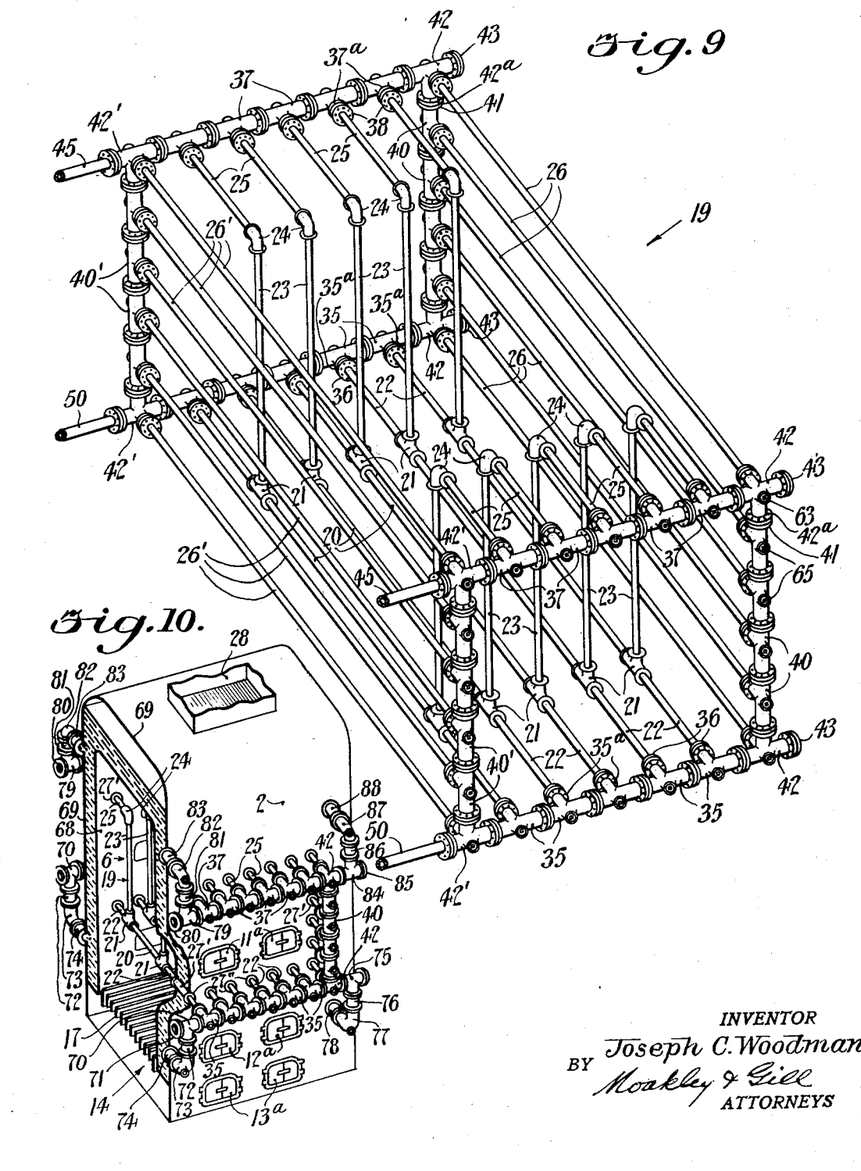
Fig. 9 is a perspective view of a modified form of basket grate.
Fig. 10 is a perspective view of a different type of furnace.

It is now apparent that the basket grate 19 comprises a bottom, spaced sides and a back, each formed of spaced pipes, the basket grate having an open front and top. The front bottom and side pipes 20 and 23, respectively, while spaced from the front wall 1 of the furnace are substantially as near the bricks thereof as the successive pipes of the same series are to each other, and there is no danger of any substantial portion of the deposited refuse falling out of the front of the basket grate. Not only are the referred to front pipes spaced from the bricks of the front wall 1, but the vertical pipes 23 adjacent to each side wall 2 of the furnace are spaced from such wall, the back-forming pipes 26 of the basket grate being spaced from the bricks of the rear furnace wall 3. Important advantages result from this arrangement, one being that the basket grate 19 is so spaced inwardly from the bricks of the furnace walls that the latter are not subject to the injury that results when wet refuse lies against the bricks. Moreover, the space surrounding the basket grate 19, and which is between it and the brick of the furnace walls, allows the flames to envelop the refuse mass on all sides. The space maintained by the back-forming pipes 26 of the basket grate between the refuse mass and the rear wall 3 of the combustion chamber prevents any danger of a shutting off of communication with the flue, even though the refuse should extend from the bottom of the basket grate to the top wall of the furnace. As shown in Fig. 9, the basket grate 19 may have pipes 26' closing its front to insure that the wet refuse therein shall not lie against the brickwork of the front wall, in which case the opposite ends of the pipes 26' will be connected to T-fittings 40' and 42' that are in end to end connection and as a whole are connected across the lower and upper conduits formed by the T-fittings 35 and 37. A clear passage is thus maintained between the basket grate 19 and the front furnace wall.

Located in the top wall 4 of the furnace over the open top of the basket grate 19 is a hopper 28, in which doors 29 are pivotally mounted as at 30. These doors are automatic in their action, being normally maintained closed by counterweights 31. The mouth of the hopper 28 opens through a floor 32, which may be that of a ramp up which vehicles can travel to dump their loads into the hopper. The weight of such loads swings the doors 29 downward admitting the discharged refuse to the combustion chamber 6 where it falls into the basket grate 19, the counterweights 31 automatically closing the doors 29 after they become relieved of the load of refuse.

Promoting smooth, mutually aiding and simultaneous operation of the doors, are connections between the shafts or trunnions 30 which pivot the doors 29. One of such connections is shown in Fig. 1, and includes levers 33 secured to the pivotal shafts 30, a link 34 connecting the outer ends of the levers 33.

Due to the shape of the basket grate 19, and the disposition of its bottom pipes 20 to form a horizontal grate, the refuse may be dumped into the basket grate and spread over its horizontal bottom throughout an area substantially corresponding to that of the shaking grates 17. Accordingly, the entire bottom and all sides of the refuse mass will be aflame, and the hot gases resulting from the combustion will permeate the entire volume of the refuse mass, preparing it for rapid and thorough combustion.

Exteriorly of the furnace walls, the extension pipes 22 of the basket grate bottom pipes 20, the horizontally directed extension pipes 25 of the vertical pipes 23 forming the sides of the basket grate and the pipes 26 forming the back of that grate are connected in a peculiar manner. The extension pipes 22 from the bottom of the basket grate 19 communicate with relatively large flanged T-fittings 35, having flanged necks the bores of which are much larger than the external diameters of the extension pipes 22, as shown in Figs. 2, 3 and 6.

Connection is effected between each large T-fitting 35 and its associated extension pipe 22 through the medium of a companion flange 36 that is bolted to a flange 35a of the T-fitting 35, and into which the extension pipe 22 is screwed. Suitable gaskets are positioned between the fitting flange 35a and the companion flange 36, and the connection between the companion flange 36 and the pipe 22 is made leak-proof.

In a similar manner, the upper extension pipes 25 from the tops of the vertical side-forming pipes 23 of the basket grate are combined with large flanged T-fittings 37. A flange 37a of each large T-fitting 37 has a companion flange 38 bolted to it, and the related extension pipe 25 is screwed into the companion flange 38.

As seen in Figs. 2, 3 and 6, the horizontal pipes 26 that form the back of the basket grate are screwed into companion flanges 39, which are in turn bolted to flanges 40a of relatively large T-fittings 40, except in the case of the top and bottom pipes 26. These upper and lowermost pipes 26 at their opposite ends are screwed into companion flanges 41 that are bolted to the flanges 42a of large four-way T-fittings 42, as shown in Fig. 5.

On opposite sides of the furnace, each T-fitting 42 for the top pipe 26 of the back of the basket grate, in addition to being in communication with that pipe, also as shown in Fig. 2, connects the adjoining upper T-fitting 37 with the uppermost T-fitting 40 for the next to the highest grate-back-forming pipe 26. In this connection, the vertical flange 37b of the T-fitting 37 is bolted to the vertical flange 42b of the four-way T-fitting 42, while the horizontal flange 40c of T-fitting 40 is bolted to the horizontal flange 42c of the T-fitting 42. A blind companion flange 43 closes the remaining outlet of the upper T-fitting 42.

In a corresponding manner, the four-way T-fitting 42 for the bottom pipe 26 connects the lowermost T-fitting 40 with the right hand end T-fitting 35 shown in Fig. 2. The flange 40d of the lowermost fitting 40 is bolted to the flange 42d of lower fitting 42, and the flange 35e of the fitting 35 is bolted to the flange 42e of lower fitting 42. A blind companion flange 43 is used to close the remaining outlet of the lower four-way T-fitting 42.

Figure 5:
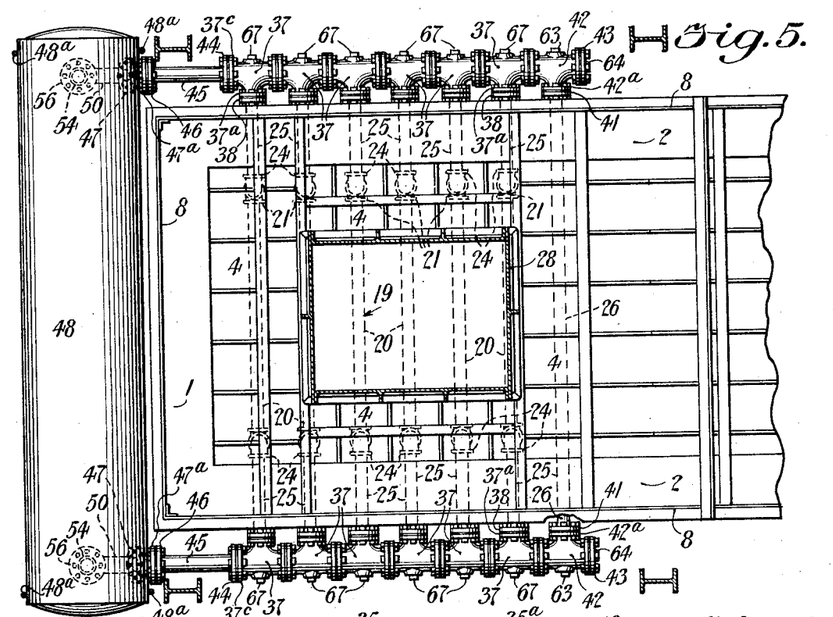
Fig. 5 is a horizontal section through an upper portion of the furnace, being taken on the line 5—5 of Fig. 4.

At each side of the furnace, the upper left hand T-fitting 37, as viewed in Figs. 2 and 5, has its left hand flange 37c bolted to a companion flange 44 into which a pipe 45 of relatively large capacity is screwed. The opposite end of each pipe 45 is screwed into a companion flange 46 that is bolted to a flange 47a of a saddle nozzle fitting 47 which is secured to and communicates with the interior of a steam drum 48, which is suitably supported as by being suspended from I-beams by loop-forming rods 48a.

In much the same manner, the left hand end T-fitting 35 of the lower pipe line that is outside of each furnace wall 2, as shown in Figs. 2 and 6, has a companion flange 49 bolted to its left hand flange 35f. Screwed into each companion flange 49 is a pipe 50 of a relatively large capacity, which is also screwed into another companion flange 51. Each of the latter flanges is bolted to a flange 52a of a flanged cross fitting 52.

Bolted to another flange 52b of each flanged cross fitting 52 is a companion flange 53 screwed into which is a vertical pipe 54. The upper end of each pipe 54 is screwed into another companion flange 55, which as seen in Figs. 1, 2 and 4, is bolted to a flange 56a of a saddle nozzle fitting 56 that is secured to and communicates with the interior of the bottom of steam drum 48. To the bottom flange 52c of each flanged cross fitting 52 is bolted a companion flange 57 into which a drain pipe 58 is screwed, a valve 59 normally closing the passage of the pipe. The remaining outlet of each flanged cross fitting 52 is closed by a blind companion flange 60 that is bolted to the flange 52d of the fitting 52.

The steam drum 48 is partly filled with water above which there is steam space for steam generated by the combustion within the furnace. On both sides of the furnace, the pipes 54 descend from the steam drum 48, and, as the valves 59 are normally closed, water extends from the steam drum through the pipes 54, the flanged cross fittings 52 and the pipes 50 to and through passages exterior to the furnace walls 2, which passages are formed by the T-fittings 35 that are arranged in an end to end continuation and form horizontal headers of much greater internal cross-section than that of the pipes 20 and extension pipes 22, thus assuring a suitable supply of water to the lower part of the basket grate.

Rising through the vertical pipes 23 that are connected to the bottom pipes 20, and which form the opposite sides of the basket grate, the water goes through the upper extension pipes 25 to enter passages exterior to the opposite furnace walls 2, which passages are formed by the end-to-end assembly of the upper T-fittings 37 which form upper horizontal headers of much greater internal cross-section than the extension pipe 25, and connected with a steam drum 48 at a higher level than the pipes 24 that connect with the lower headers, thus assuring suitable circulation through the basket grate.

The four-way T-fittings 42 allow the water to pass through the top and bottom pipes 26 of the back of the basket grate 19. The lower four-way T-fittings 42 on each side of the furnace also serve as elbows and connect the passages formed by the T-fittings 35 with vertical passages or headers resulting from the one-above-the-other grouping of the T-fittings 40. The passages formed by the fittings 40 are connected by the upper four-way T-fittings 42 that serve as elbows with the passages that are formed by the upper T-fittings 37, a return from which is made by the pipes 45 to the steam drum 48.

Accordingly, a circulatory water system is produced extending from the steam drum 48 by pipes 54 and 50, to U-shaped conduits on opposite sides of the furnace, which conduits are formed by the T-fittings 35, 40 and 37 coupled by the four-way T-fittings 42, the pipes 45 furnishing a return to the steam drum, and the pipes of the basket grate 19 within the furnace being connected across such U-shaped conduits.

In operating the furnace, kindling material is passed through the doorways 10 and 12 and ignited upon the shaking grates 17. As refuse, such as garbage and rubbish is fed into the hopper 28, the automatic doors 29 swing downward under the weight of the refuse, allowing the latter to fall into and upon the extensive horizontal bottom of the basket grate 19. The spaced pipes 20 of the basket grate bottom and the side pipes 23 of the basket grate support the deposit so that the flames from the fire on the shaking grates 17 may have access to the refuse on the bottom and sides to ignite the refuse, which, as it becomes partially consumed and dried falls through the bottom of the basket grate onto the shanking grates 17, where it is completely consumed, the fine ash ultimately finding its way into the ash pit 14.

After each deposit of refuse passes through the hopper 28, the counter weights 31 automatically close the doors 29, the levers 33 and link 34 causing one door to assist in closing the other in case it tends to stick or close at a faster rate.

Access to the basket grate 19 may be had through the doorway 9 in the front wall 1 of the furnace and through the doors 11 in the side walls 2 thereof. Thus, an attendant may get at any part of the basket grate 19 and with a poker, or other suitable tool, reach thereinto through the doorway 9, or through the doorways 11 in either side wall of the furnace, and between the vertical pipes 23 forming the sides of the basket grate. In this way, the mass of deposited refuse may be stirred and kept loose, whereby the heat from the fire and that refracted by the brick walls may penetrate the refuse mass and so dry it as to improve the completeness and rapidity of its combustion. Similarly, the control of the burning material on the shaking grates 17 is to be had through the doorways 10 and 12 in the front and side walls, respectively, of the furnace.

Inherent in the furnace structure herein set forth is its capability of easy and quick repair without dismantling in part or in whole the walls of the furnace. Though the basket grate 19 is water-cooled, and not likely to become injured by the process of combustion transpiring in the furnace, if any of its constituent parts should accidentally become burnt out, it may be removed and repaired or replaced in a minimum of time and with great simplicity.

According to the position of the improperly functioning, defective or injured part, the water-cooling system is first partially or entirely drained. If, for example, one or more of the pipes become clogged, or need cleaning, it may often be accomplished by removing plugs at opposite ends of a passage so that the opposite ends of the latter are open. A cleaning tool may then be passed through the passage from end to end to clean the same, or to dislodge an obstruction formed therein. To clean the bottom pipes 20 of the basket grate, screw plugs 61 in the T-fittings 35 that are on opposite sides of the furnace are removed. Each bottom pipe 20 of the grate and the extension pipes 22 at its opposite ends form a single continuous passage, which opens to the atmosphere through the associated T-fittings 35, when the screw plugs 61 of the latter are removed.

Similarly, the back-forming pipes 26 of the basket grate form a continuous passage terminating in the interiors of the T-fittings 40 or 42, and when the screw plugs 62 of the former and 63 of the latter are removed, the bores of the pipes are open from end to end to the atmosphere.

In the blind companion flange 43 of the upper four-way T-fitting 42, on either side of the furnace, is a screw plug 64 that may be removed, after which a long cleaning swab, or other tool, may be inserted through fittings 42 and 37, and the pipe 45, if desired. Screw plugs 67 in the upper row of T-fittings 37, on either side of the furnace, give access to the upper extension pipes 25. Removal of screw plug 65 in either lower blind companion flange 43 permits cleansing of the passage formed by T-fittings 42 and 35 and pipe 50, a screw plug 66 in the blind companion flange 60 that is fastened to the flanged cross fitting 52 facilitating this procedure.

If, instead of a cleaning of the pipes, or the removing of obstructions therefrom, a replacement of one or more of them is necessary it may be very easily effected. Should it be necessary to remove one of the pipes 20 of the bottom of the basket grate 19, for instance, a workman may remove the bolts that hold any T-fitting 35 to the T-fittings 35 (or 35 and 42) at its opposite ends, and the bolts that secure the flange 35a of its remaining neck to its companion flange 36. The T-fitting 35 thus disconnected may then be removed, after which the companion flange 36 and the pipe 22 screwed thereinto may be removed as a unit, the pipe 22 being screwed out of its ordinary T-fitting 21 and withdrawn through the sleeve it normally occupies in the side wall 2 of the furnace. The extension pipes 22 at opposite ends of any grate-bottom pipe 20 may be removed in this manner.

If the corresponding extension pipes 25 are removed through their sleeves in the furnace walls 2 in similar manner, by disconnecting and removing axially aligned upper T-fittings 37 that are exterior to opposite walls 2, and screwing the uncoupled companion flanges 38 and the related pipes 25 as units out of the fittings 24, the vertical pipes 23 may be screwed out of the fittings 21 on the grate-bottom pipes 20. Pipes 20, with their associated fittings 21 still screwed thereon, may then be removed, as through one of the doors 12. The normally vertical side-forming pipes 23 may be similarly removed with the elbows 24 attached thereto. A workman may enter the combustion chamber through one of the doors 9 or 10, using the shaking grates 17 as a platform, or he may enter through the hopper 28 to the interior of the basket grate. There he may disconnect and remove any unsatisfactory side pipe 23 or bottom pipe 20, after separating parts associated therewith to acquire necessary clearance to remove the pipe.

Any of the pipes 26 forming the back of the basket grate 19 may be removed in substantially the same manner, but even more simply, by removing the proper intermediate flanged T-fitting 40, or the top or bottom four-way flanged T-fitting 42, disconnecting the pipe 26 from the companion flange associated with the T-fitting at the opposite end of the pipe, and pulling this pipe 26 through the sleeves in furnace walls 2 and out of the furnace.

Exteriorly of the furnace side walls 2, any of the relatively large flanged T-fittings 35, 37, 40 and 42 may be individually withdrawn from the external conduit of which it is a part, and may be replaced by a substitute fitting if necessary. The external pipes 45, 50, 54 and 58, as well as the flanged cross fittings 52 and the valves 59 may all be easily removed and replaced.

While the basket grate and the remainder of the circulatory liquid system has been described in connection with a brick furnace, it is to be understood that it may be combined with other types of incinerators. For example, an all steel incinerator is illustrated in Fig. 10 and has an inner steel sheathing 68 which forms the combustion chamber 6, the box-like structure formed by the sheathing 68 being surrounded by an outer sheathing 69 so that there is a water jacket existing between the inner of the outer sheathings 68 and 69. The outer box-like structure formed by sheathing 69 extends above the top of the combustion-chamber-forming sheathing 68 sufficiently to create a reservoir that is in communication with the water jacket that surrounds the combustion chamber 6, the water level in the reservoir being sufficiently below the top of the sheathing 69 to leave space for steam that is generated in consequence of the combustion taking place within the furnace.

In general, the all steel type of incinerator hereinbefore corresponds to the brick furnace hereinbefore described insofar as its other elements are concerned. The basket grate 19 is supported in the combustion chamber 6, the extensions 22 of the bottom pipes 20 of the basket grate projecting through sleeves 27' which are provided with flanges 27" at their opposite ends, the opposite flanges of each sleeve 27' being welded or riveted to the inner and outer sheathing 68 and 69 respectively. In a similar manner the pipes 25 which form lateral extensions from the upper ends of the vertical side-forming pipes 23 pass through other sleeves 27'. After emerging from the side walls 2 of the all steel incinerator, the pipes 25 are connected to the upper branches of the conduits formed by the flanged fittings 37, while the pipes 22 that extend from the horizontal bottom of the basket grate 19 are connected as hereinbefore described to the lower branches of the external conduits formed with the flanged fittings 35 in the manner previously set forth. The lower and upper conduit branches are connected by vertically interconnecting sections formed of T-fittings 40, the interconnecting sections being combined with the lower and upper conduit branches by the four-way T-fittings 42.

Since the water jacket and reservoir are present between the inner and outer sheathings 68 and 69, respectively, in this form of incinerator, the connections between the conduits exterior to the side walls of the incinerator are made in a slightly different manner. To the left hand lower fitting 35 of each external conduit is bolted a T-fitting 70 the end of which is closed by a blind flange 71, and the remaining outlet of which has its flange connected to the adjoining flange of a short flanged pipe 72. The lower flange of this short pipe is connected to the upper flange of an elbow 73, the flange at the other end of the elbow being secured to the flange of a nozzle 74 the opposite flange of which is fastened to the outer sheathing 69. At the right hand of each lower branch of the external conduit a T-fitting 75 is secured to the adjoining flange of the bottom four-way T-fitting 42. The flange of the downwardly extending neck of the T-fitting 75 is secured to the flange of a short flanged pipe 76, the lower flange of which is bolted to the upper flange of an elbow 77, the other flange of the elbow being secured to the adjoining flange of a nozzle 78 the flange at the opposite end of which is also secured to the outer sheathing 69, establishing communication with the water jacket.

In like manner the left end T-fitting 37 of the upper branch of each external conduit has a flange of a T-fitting 79 secured to it, the flange at the opposite end of this T-fitting having a blind flange 80 secured thereto sealing that end of the fitting. The upwardly extending neck of the T-fitting 79 has a flange to which is secured the lower flange of another short flanged pipe 81. The upper flange of the short pipe 81 is coupled to one flange of an elbow 82, the flange at the other end of which is fastened to the adjoining flange of a nozzle 83, the flange at the other end of which is secured to the outer sheathing 69 of the incinerator. At the right, the upper branch of each external conduit has a flange of a T-fitting 84 secured to the end flange of the four-way T-fitting 42. A blind flange 85 closes the outer end of the T-fitting 84, and to the flange of the upwardly directed neck of the T-fitting 84 is fastened the lower flange of a short flanged pipe 86. To the upper flange of the pipe 86 is secured one flange of an elbow 87 the other flange of which is attached to the adjoining flange of a nozzle 88 a flange of which is secured to the sheathing 69 that forms the outer shell of the all steel incinerator.

In the manner set forth, the circulatory system for the all steel incinerator is caused to be the equivalent of the circulatory system for the brick furnace. Water from the water jacket formed by the inner and outer sheathings 68 and 69 enters the nozzles 74 and 78 at opposite ends of the lower branch of each of the external conduits, and at the left passes through the elbow 73, short pipe 72, T-fitting 70 and into the left hand T-fitting 35 of the conduit on each side of the incinerator. At the right, water from the water jacket coming through the nozzle 78 passes through the elbow 77, short pipe 76 and T-fitting 75 into the four-way T-fitting 42 in the lower branch of each external conduit. The water then passes into the right hand T-fitting 35 of each external conduit and also into the vertically extending T-fittings 40. Thus, the water extends through the lower branch of each external conduit, which is formed of the T-fittings 35, through the vertical interconnecting branch thereof, which is formed of the T-fittings 40 and into the upper branch of each external conduit which is formed of the fittings 37.

As in the case of the brick furnace, the bottom pipes 20 of the basket grate are in communication through extension pipes 22 with the T-fittings 35 of the lower branch of each external conduit, the extension pipes 25 being in communication with the T-fittings 37 of the upper branch of each external conduit and coacting with the vertical pipes 23 of the basket grate to place the bottom pipes 22 in communication with the upper branch of each external conduit. The back-forming pipes 26 of the basket grate extend through sleeves 27' and are in communication at their opposite ends with the vertically arranged T-fittings 40 of each external conduit.

The circulatory system of the all steel incinerator is, therefore, in effect, constructed in substantial correspondence to that of the brick furnace, except for such modifications as adapt the circulatory system to water jacketed incinerators. In other respects, the incinerator of the type shown in Fig. 10 corresponds in essential details to that of the brick furnace.

The whole arrangement of the elements produces a substantial furnace, and when of the brick type the brick walls absorb and internally radiate heat which promotes the drying and rapid combustion of refuse deposited in the combustion chamber. The steel jacket around the furnace filled with thermal insulation further contributes to the efficiency of the operation of the furnace, and makes a neat appearance and saves floor space over the ordinary masonry setting. Repairs, when necessary, are made with ease and simplicity, often with the necessity of a removal of only a few parts, and, when most extensive, many or all of the parts may be removed and replaced with a few common tools and with labor that need not be particularly skilled. While a preferred form of the invention has been shown and described, it will, of course, be understood that various alterations in design and construction may be indulged in without departing from the spirit of the invention as defined in the appended claims.

I claim:

1. An incinerator comprising a furnace chamber having side walls and ends one of which is provided with an outlet for gaseous products of combustion, a water cooled basket grate for drying material before burning, said basket grate including a series of spaced hollow U-shaped portions extending from end to end of the chamber and a series of hollow horizontal members arranged one above another at the outlet end of the chamber, fluid containing means providing space for steam separation, exterior U-shaped headers at opposite sides of the chamber with one leg of each U-shaped header at the level of the bottom of the basket grate and communicating with said fluid containing means, the other leg at the level of the top of the basket grate and communicating with said fluid containing means, and the base substantially in a plane determined by the series of horizontal members, and individual connections between the members of the basket grate and the corresponding portions of the U-shaped headers.

2. An incinerator comprising a furnace chamber with side walls and ends, a basket grate comprising hollow transverse members forming an end thereof and a series of spaced hollow U-shaped portions forming the sides and bottom, exterior longitudinal headers at opposite sides of the furnace chamber at the levels of the tops and bottoms of said U-shaped portions and having individual connections therewith, external upright headers at opposite sides of the furnace chamber and opposite the ends of the hollow transverse members, and a steam and water separating drum in communication with all of said headers.

3. An incinerator comprising a furnace chamber with side walls and ends, a basket grate comprising hollow transverse members forming an end thereof and a series of spaced hollow U-shaped portions forming the sides and bottom, steam and water separating drum means, and circulation connections between the drum means and the basket grate including an external U-shaped header with one leg opposite the bottoms of said U-shaped members and having individual connections therewith through the corresponding side wall, another leg opposite the tops of said U-shaped members and having individual connections therewith, and the base opposite the corresponding ends of said hollow transverse members and having individual connections therewith through the side walls.

4. An incinerator comprising a chamber with side walls and ends, a basket grate comprising spaced hollow U-shaped parts forming the sides and bottom of the grate, steam and water separation drum means, and circulation connections between the drum means and the basket grate including a lower external header extending along one side of the chamber and having individual connections through the adjacent wall with the bottoms of said U-shaped parts, an upper external header having individual connections with the tops of said U-shaped parts, and an upright connection between the lower and upper external headers.

5. In an incinerator, a furnace chamber having side walls and ends, and a fluid circulatory system including upper and lower external headers and a basket grate comprising a series of U-shaped sections formed of pipe fittings and pipes of which certain pipes extend from the bottoms and tops of said U-shaped sections through apertures in said side walls enabling axial withdrawal therethrough and are connected with said headers, said headers comprising successive flanged fittings of which certain ones are opposite said apertures and are connected with the pipes extending therethrough, whereby removal of one of such fittings will enable axial removal of a pipe connected therewith.

6. In a furnace, walls forming a combustion chamber, a fluid circulatory system comprising communicating upper and lower external headers extending along the sides of the chamber and a basket grate comprising a series of spaced sections individually connected at their tops and bottoms with the corresponding external headers, said headers including successive flanged fittings coupled for individual removal and said basket grate being formed of connected pipes some of which extend through said walls in alignment with certain of said fittings.

7. In a furnace, a furnace chamber having ends and side walls provided with pipe passageways, fluid containing means providing steam space, exterior headers at opposite sides of the chamber having at each side thereof upper and lower sections connected to said fluid containing means at different levels and a section connecting the upper and lower section, such sections being formed of individually removable T-fittings, and a basket grate comprising a series of spaced sections individually connected at their tops and bottoms with the corresponding header sections, said basket grates being made up of pipe fittings and pipes some of which pass through said passageways in alignment with pairs of T-fittings in the header sections at opposite sides of the chamber, whereby removal of one or more of said T-fittings permits withdrawal to said walls of pipes forming part of said basket grate.

8. An incinerator comprising a chamber with side walls and ends, a basket grate comprising a series of hollow U-shaped sections, fluid containing means providing space for steam separation, and circulation connections between the fluid containing means and the basket grate including at each side of the chamber communicating upper and lower external headers individually connected with the tops and bottoms of said U-shaped sections and connected with the fluid containing means at different levels.

In testimony whereof I affix my signature.

JOSEPH C. WOODMAN.